ns Patent Office
3,333,961
Patented Aug. 1, 1967

3,333,961
HETEROCYCLIC COMPOUNDS, THEIR PRODUCTION AND USE
Douglas James Fry and Patrick Joseph Keogh, Ilford, Essex, England, assignors to Ilford Limited, Ilford, England, a British company
No Drawing. Filed Dec. 30, 1963, Ser. No. 334,644
Claims priority, application Great Britain, Jan. 16, 1963, 2,037/63
19 Claims. (Cl. 96—109)

This invention relates to heterocyclic compounds, more particularly penta-azaindene compounds, to their production and to their use as stabilising agents for photographic emulsions.

The parent penta-azaindene is positionally numbered as follows:

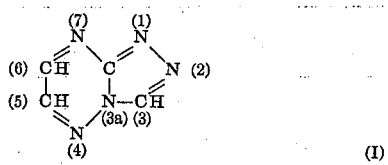

According to the present invention there are provided, as a new class of chemical compounds, penta-azaindene compounds of the general Formula II:

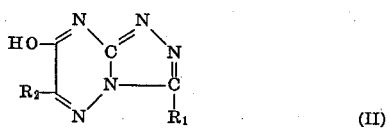

where $R_1$ is a hydrogen atom or an alkyl, aryl, aralkyl, mercapto, alkylthio, or aralkylthio group, and $R_2$ is a hydrogen atom or an alkyl, aryl, aralkyl or alkoxycarbonyl group, with the exception of the case where, simultaneously, $R_1$ is a hydrogen atom and $R_2$ is a methyl group.

According to a further feature of the present invention compounds of the said general Formula II (and including the compound excepted therefrom) are prepared by any of the following methods:

(a) By reacting a triazine of the general Formula III:

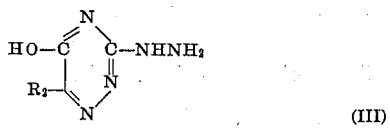

where $R_2$ has the meaning assigned to it above with carbon disulphide in alcoholic solution in the presence of a strong organic base, e.g. triethylamine, or an alkali metal hydroxide, e.g. sodium ethoxide, until hydrogen sulphide is no longer evolved, thereby to produce a compound of general Formula II in which $R_1$ is mercapto.

(b) By reacting a mercapto compound as produced by method (a) with an alkylating or aralkylating agent in neutral or alkaline solution, thereby to produce a compound of general Formula II where $R_1$ is alkylthio or aralkylthio.

(c) By reacting a triazole of general Formula IV:

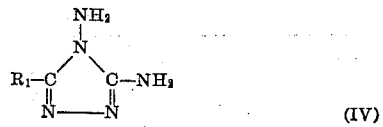

wherein $R_1$ has the meaning assigned to it above with an α keto acid or ester of general Formula V:

wherein $R_2$ has the meaning assigned to it above and $R_3$ is a hydrogen atom or an alkyl group.

(d) By treating the corresponding mercapto compound where $R_1$ is mercapto or alkylthio or aralkylthio with Raney nickel catalyst containing absorbed hydrogen, thereby a produce a corresponding compound wherein $R_1$ is hydrogen.

(e) By ring closure of compounds of general Formula VI:

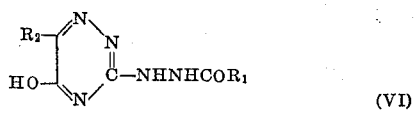

where $R_2$ has the meaning assigned to it above, thereby to produce compounds where $R_1$ is a hydrogen atom, or an alkyl, aryl or aralkyl group. This ring closure may be effected by treating the compound just above its melting point or by heating with an acid, preferably by heating with an acid of the formula $R_1COOH$.

The compounds of this invention, and the compound where $R_1$=H and $R_2$=$CH_3$, have been found to be valuable stabilising agents for photographic silver halide emulsions. Only very small quantities of the compounds are necessary to stabilise the emulsions against development of fog. For example, a range of quantities of 0.02 to 1 gm. for an emulsion containing 1½ g. mols silver halide, e.g. iodobromide, is typically sufficient.

The following examples will serve to illustrate the invention:

EXAMPLE 1

Preparation of 5-methyl-6-hydroxy-1,2,3a,4,7-penta-azaindene

This compound was prepared according to the method described by Fusco and Rossi, Rend. Inst. Lom. 88, 184 (1955). (C.A. 50, 10743a.)

3-hydrazino - 5 - hydroxy - 6 - methyl - 1,2,4-triazine (16.0 g.) in formic acid (160 ml. of 95% w./w.) and water (20 ml.) was refluxed for 2½ hrs. After evaporating down under vacuum almost to dryness, ethanol (100 ml.) was added and the product (13 g.) filtered off; two crystallisations from ethanol (1¼ litres and 1 litre), yielded colourless flakes (9.5 g.), M. Pt. 274–275.

The same compound was obtained when 3,4-diamino-1,2,4-triazole (10 g.) and ethyl pyruvate (12.3 ml.) were reacted together in glacial acetic acid (50 ml.) for 2½ hours. The reaction mixture was poured into cold ethanol (500 ml.) and the precipitate collected (10.5 g.). Recrystallisation from ethanol (1 litre) yielded colourless flakes, 7 g., M. Pt. 274–275.

The same compound was also prepared by the following procedure:

A solution of 6-hydroxy-3-mercapto-5-methyl-1,2,3a,4,7-penta-azaindene (5 g.) in ammonium hydroxide (10 ml. of s.g. 0.920) and water (15 ml.) was refluxed for 1 hour with Raney nickel (20 g.) by which time the initial deep yellow colour had faded. The solids were then removed by filtration and the filtrate, after acidification, was evaporated to half volume and cooled. Colourless plates (2.2 g.) were obtained.

The infra-red absorption spectra of all three products showed them to be identical. The 3,4-diamino-1,2,4-triazole was prepared from N,N'-diamino guanidine hydriodide and formic acid (cf. Gaiter, Gazz, Chim. Ital. 45, I, 457, (1915)).

The product was added to silver iodobromide emulsion at the rate of 0.5 g. per 1½ mols silver halide and the emulsion coated on a support. A control coating was made with emulsion not containing the product. Specimens of the control and test coatings were tested for fog density and speed immediately after coating. Further specimens were stored in a sealed container for 14 days at 120° F. and 56% relative humidity, and the tests for speed and fog density repeated. The following table shows the results obtained:

|         | Initial Test | | After 14 days at 120° F. | |
|---------|--------------|---------------|-------------|---------------|
|         | Fog density  | Rel. log speed | Fog density | Rel. log speed |
| Control | 0.12 | 5.00 | 0.39 | 4.85 |
| Test    | 0.09 | 4.97 | 0.09 | 4.99 |

EXAMPLE 2

*Preparation of 6-hydroxy-3-mercapto-5-methyl-1,2,3a,4,7-penta-azaindene*

A mixture of 3-hydrazino-5-hydroxy-6-methyl-1,2,4-triazine (16 g.), carbon disulphide (8.6 g.), triethylamine (33 g.) in methanol (500 ml.) was refluxed for 16 hours by which time hydrogen sulphide had ceased to be evolved: the solution was then evaporated under vacuum to dryness. The residue was dissolved in water (200 ml.) and acidified with concentrated hydrochloric acid (20 ml.): on cooling, the crude material crystallised and was filtered off and recrystallised three times from water to yield yellow needles (4.5 g. from 120 ml. water), M. Pt. 310–315 with evolution of hydrogen sulphide and resolidification.

The same compound was obtained when 3,4-diamino-5-mercapto-1,2,4-triazole (4 g.) and ethyl pyruvate (4 ml.) were reacted together in refluxing acetic acid (70 ml.). On refluxing for 1 hr. the triazole gradually dissolved and the product crystallised out. The product was filtered off after cooling and recrystallised from water to give transparent yellow needles (2.2 g.), M. Pt. 310–315, with evolution of hydrogen sulphide and resolidification.

The same product was also prepared as follows:
Sodium (2.2 g.) was dissolved in ethanol (200 ml.) and to the resulting solution 3-hydrazino-5-hydroxy-6-methyl-1,2,4-triazone (15 g.) and carbon disulphide (10 ml.) were added. The mixture was refluxed for 3 hours, during which time hydrogen sulphide was evolved and a crystalline solid formed. After cooling, the mixture was filtered to yield solid and filtrate. The solid was dissolved in water and the resulting solution acidified with concentrated hydrochloric acid, whereupon the product was obtained as a yellow precipitate. This was filtered off and recrystallised from water as yellow needles, M. Pt. 310–315° C. with evolution of hydrogen sulphide and resolidification.

The infra-red absorption spectra of all three products were identical. The 3,4-diamino-5-mercapto-1,2,6-triazole was prepared from bisthiourea and hydrazine hydrate as described by Hoggarth, J. Chem. Soc., 1952, 4818.

The product was tested in the same way as the product of Example 1. The following table shows the results obtained using 0.1 g. of product per 1½ mols silver iodobromide.

|         | Initial Test | | After 14 days at 120° F. | |
|---------|--------------|---------------|-------------|---------------|
|         | Fog density  | Rel. log speed | Fog density | Rel. log speed |
| Control | 0.13 | 4.93 | 0.44 | 4.95 |
| Test    | 0.07 | 4.87 | 0.05 | 4.99 |

EXAMPLE 3

*Preparation of 6-hydroxy-3-methylthio-5-methyl-1,2,3a,4,7-penta-azaindene*

6-hydroxy-3-mercapto-5-methyl-1,2,3a,4,7-penta-azaindene (3 g.) was dissolved in methanol (75 ml.) and water (25 ml.) and methyl iodide (12.5 ml.) added. After refluxing for 4 hours some of the solvent was removed under vacuum whereupon crystallisation occurred. The crystals (2 g.) were collected and recrystallised from water (150 ml.) to yield transparent colourless needles, M. Pt. 260–262.

The same compound was obtained when 3,4-diamino-5-methylthio-1,2,4-triazole (2 g.) and ethyl pyruvate (2 ml.) were reacted together in refluxing acetic acid (30 ml.) for 4 hours. The product was precipitated by adding ether (300 ml.) and recrystallised from water to give transparent colourless needles (1.3 g.), M. Pt. 260–262.

The infra-red absorption spectra of both products were identical. The 3,4-diamino-5-methylthio-1,2,4-triazole was prepared as described by Hoggarth, J. Chem. Soc., 1952, 4819.

The product was tested in the same way as the product of Example 1. The following table shows the results obtained using 0.5 g. product per 1½ mols of silver iodobromide.

|         | Initial Test | | After 14 days at 120° F. | |
|---------|--------------|---------------|-------------|---------------|
|         | Fog density  | Rel. log speed | Fog density | Rel. log speed |
| Control | 0.12 | 4.98 | 0.39 | 4.93 |
| Test    | 0.08 | 5.00 | 0.14 | 5.00 |

EXAMPLE 4

*Preparation of 3,5-dimethyl-6-hydroxy-1,2,3a,4,7-penta-azaindene*

3,4-diamino-5-methyl-1,2,4-triazole (11.2 g.) and ethyl pyruvate (13 g.) were reacted together in refluxing glacial acetic acid (25 ml.) for 2½ hours. The reaction mixture, after cooling, was poured into a mixture of ethanol (100 ml.) and ether (400 ml.) and the precipitate collected (7 g.), M. Pt. 235° C. Two recrystallisations from ethanol yielded colourless needles, M. Pt. 248° C.

The product was tested in the same way as the product from Example 1. The following table gives the results obtained using 0.65 g. compound per 1½ moles silver halide.

|         | Initial Test | | After 14 days at 120° F. | |
|---------|--------------|---------------|-------------|---------------|
|         | Fog density  | Rel. log speed | Fog density | Rel. log speed |
| Control | 0.10 | 5.04 | 0.39 | 4.96 |
| Test    | 0.04 | 4.87 | 0.04 | 4.95 |

EXAMPLE 5

*Preparation of 3-ethyl-6-hydroxy-5-methyl-1,2,3a,4,7-penta-azaindene*

3,4-diamino-5-ethyl-1,2,4-triazole (12.4 g.) and ethyl pyruvate (13 g.) were reacted together in refluxing glacial acetic acid (25 ml.) for 2½ hours. The reaction mixture, after cooling, was poured into ether (500 ml.) and the precipitate collected (10 g.). Recrystallisation from ethanol yielded colourless plates (3 g.), M. Pt. 186° C.

The product was tested in the same way as the product from Example 4. The following table gives the results obtained.

|         | Initial Test | | After 14 days at 120° F. | |
|---------|--------------|---------------|-------------|---------------|
|         | Fog density  | Rel. log speed | Fog density | Rel. log speed |
| Control | 0.10 | 5.04 | 0.39 | 4.96 |
| Test    | 0.04 | 4.98 | 0.04 | 4.98 |

EXAMPLE 6

*Preparation of 3-benzylthio-6-hydroxy-5-methyl-1,2,3a,4,7-penta-azaindene*

3,4-diamino-5-benzylthio-1,2,4-triazole (9 g.) and ethyl pyruvate (6 ml.) were reacted together in refluxing glacial acetic acid (30 ml.) for 4 hours. On cooling the reaction mixture the product crystallised out of the solution and was filtered off. Recrystallisation from ethanol (180 ml.) yielded pink tinged needles (6 g.), M. Pt. 204° C.

The product was tested in the same way as the product from Example 4. The following table gives the results obtained.

|  | Initial Test | | After 14 days at 120° F. | |
| --- | --- | --- | --- | --- |
|  | Fog density | Rel. log speed | Fog density | Rel. log speed |
| Control | 0.12 | 5.03 | 0.45 | 5.10 |
| Test | 0.05 | 4.76 | 0.04 | 4.83 |

EXAMPLE 7

*Preparation of 6-hydroxy-1,2,3a,4,7-penta-azaindene*

3,4-diamino 1,2,4-triazole (4 g.) and ethyl glyoxylate (5 ml. crude) were reacted together in refluxing glacial acetic acid (10 ml.) for 1½ hours. On cooling the reaction mixture the product crystallised out of solution and was filtered off. Recrystallisation from ethanol (500 ml.) yielded colourless needles (2.8 g.), M. Pt. 271–272° C. dec.

The same product was obtained when 3,4-diamino-1,2,4-triazole hydrochloride (13.5 g.), pyridine (10 ml.) and ethyl diethoxyacetate (17.6 g. crude) were reacted together in refluxing glacial acetic acid (100 ml.) for 2½ hours. The acetic acid was then distilled off under reduced pressure. The residue remaining was triturated twice with ether and once with ethanol (50 ml.) to yield a solid (4.5 g.), M. Pt. 262–266° C. Recrystallisation from ethanol yielded colourless needles, M. Pt. 271–272° C. dec.

The same product was obtained when to 3,4-diamino-1,2,4-triazole (2.5 g.) dissolved in acetic acid (10 ml.) and water (20 ml.) was added glyoxylic acid hydrate (3.5 g.) dissolved in water (10 ml.). The resulting solution was heated at 75° C. for 15 minutes. On cooling crystals of the condensation product (1 g.) were filtered off. Reheating produced a further crop. The condensation product (0.9 g.) was then suspended in glacial acetic acid (5 ml.) and heated under reflux whereupon the solid dissolved within 10 minutes. After a further 10 minutes refluxing, the mixture was cooled and ethanol (5 ml.) added. After standing at 20° C. for ½ hour the cyclised product was filtered off, M. Pt. 266–268° C. dec.

The infra-red absorption spectra of all three products showed them to be identical.

The product was tested in the same way as the product from Example 4. The following table gives the results obtained.

|  | Initial Test | | After 14 days at 120° F. | |
| --- | --- | --- | --- | --- |
|  | Fog density | Rel. log speed | Fog density | Rel. log speed |
| Control | 0.12 | 5.03 | 0.45 | 5.10 |
| Test | 0.07 | 5.06 | 0.07 | 5.06 |

EXAMPLE 8

*Preparation of 6-hydroxy-3-methylthio-1,2,3a,4,7-penta-azaindene*

3,4-diamino-5-methylthio-1,2,4-triazole (2.9 g.) and ethyl glyoxylate (3 g. crude) were reacted together in refluxing glacial acetic acid for 4 hours. On cooling the reaction mixture the product crystallised out of solution and was filtered off. Recrystallisation from 2-methoxyethanol (250 ml.) yielded pale yellow needles (2.1 g.), M. Pt. 280–290° C. dec.

The product was tested in the same way as the product from Example 4. The following table gives the results obtained.

|  | Initial Test | | After 14 days at 120° F. | |
| --- | --- | --- | --- | --- |
|  | Fog density | Rel. log speed | Fog density | Rel. log speed |
| Control | 0.12 | 5.03 | 0.45 | 5.10 |
| Test | 0.07 | 5.02 | 0.19 | 5.06 |

EXAMPLE 9

*Preparation of 3-benylthio-6-hydroxy-1,2,3a,4,7-penta-azaindene*

3,4-diamino-5-benzylthio-1,2,4-triazole (9 g.) and ethyl glyoxylate (6 ml. crude) were reacted together in refluxing glacial acetic acid (30 ml.) for 3 hours. On cooling the reaction mixture the product crystallised out of solution and was filtered off. Recrystallisation from ethanol (500 ml.) yielded colourless plates (2 g.), M. Pt. 230°C.

The produce was tested in the same way as the product for Example 4. The following table gives the results obtained.

|  | Initial Test | | After 14 days at 120° F. | |
| --- | --- | --- | --- | --- |
|  | Fog density | Rel. log speed | Fog density | Rel. log speed |
| Control | 0.12 | 5.03 | 0.45 | 5.10 |
| Test | 0.07 | 4.92 | 0.07 | 4.95 |

EXAMPLE 10

*Preparation of 6-hydroxy-3-methyl-1,2,3a,4,7-penta-azaindene*

3,4-diamino-5-methyl-1,2,4-triazole (4.5 g.) and ethyl glyoxylate (6 ml. crude) were reacted together in refluxing glacial acetic acid (10 ml.) for 1½ hours. Ethanol (30 ml.) was then added to the reaction mixture. After standing at 20° C. for ½ hour the product (4 g.) was filtered off. Recrystallisation from ethanol (500 ml.) yielded long colourless needles (2 g.), M. Pt. 275–280° C.

EXAMPLE 11

*Preparation of 3-ethyl-6-hydroxy-5-phenyl-1,2,3a,4,7-penta-azaindene*

3,4-diamino-5-ethyl-1,2,4-triazole (3.2 g.) and ethyl phenylglyoxylate (4.5 g.) were reacted together in refluxing glacial acetic acid (3.2 ml.) for 3½ hours. The product crystallised out during the course of the reaction. The reaction mixture was then dissolved in boiling ethanol (250 ml.) and decolourising charcoal added. After filtration, the solution deposited a yellow crystalline powder (3.1 g.), M. Pt. 226–235° C. Recrystallisation from ethanol yielded fluffy needles (1.6 g.), M. Pt. 226° C.

The product was tested in the same way as the product from Example 1. The following table gives the results obtained using 0.16 g. compound per 1½ moles silver halide.

|  | Initial Test | | After 14 days at 120° F. | |
| --- | --- | --- | --- | --- |
|  | Fog density | Rel. log speed | Fog density | Rel. log speed |
| Control | 0.10 | 5.04 | 0.39 | 4.96 |
| Test | 0.07 | 4.68 | 0.07 | 4.70 |

EXAMPLE 12

*Preparation of 6-hydroxy-3-methyl-5-phenyl-1,2,3a,4,7-penta-azaindene*

3,4-diamino-5-methyl-1,2,4-triazole (4.5 g.) and ethyl phenylglyoxylate (7.2 g.) were reacted together in refluxing glacial acetic acid (10 ml.) for 2 hours. The product crystallised out during the course of the reaction. Ethanol (30 ml.) was then added to the reaction mixture. After standing at 20° C. for ½ hour, product (3 g.) was filtered off. Recrystallisation from ethanol (300 ml.) yielded pale yellow long needles (2 g.), M. Pt. 310-313° C. dec.

EXAMPLE 13

*Preparation of 6-hydroxy-5-phenyl-1,2,3a,4,7-penta-azaindene*

3,4-diamino-1,2,4-triazole (4 g.) and ethyl phenylglyoxylate (7.2 g.) were reacted together in refluxing glacial acetic acid (10 ml.) for 3½ hours. The product crystallised out during the course of the reaction. Ethanol (30 ml.) was then added to the reaction mixture. After standing at 20° C. for ½ hour, the product (4 g.) was filtered off. Recrystallisation from ethanol (200 ml.) yielded pale yellow needles (2 g.) M. Pt. 274-277° C. dec.

EXAMPLE 14

*Preparation of 6-hydroxy-3-mercapto-5-phenyl-1,2,3a,4,7-penta-azaindene*

Sodium (7.7 g.) was dissolved in ethanol (1400 ml.) and to the resulting solution 3-hydrazino-5-hydroxy-6-phenyl-1,2,4-triazine (73 g.) and carbon disulphide (35 ml.) were added. The mixture was refluxed for 2 hours, during which time hydrogen sulphide was evolved and a crystalline solid formed. The reaction mixture was filtered hot to yield solid (A) and filtrate (AF). Solid (A) (53 g.) was recrystallised twice from methanol and the resulting solid (18 g.) added to water (300 ml.). After filtering off an insoluble material the filtrate was acidified with concentrated hydrochloric acid to yield a yellow crystalline solid (8.5 g.). Recrystallisation of the latter from methanol (600 ml.) yielded bright yellow crystals, M. Pt. 293-294° C.

EXAMPLE 15

*Preparation of 6-hydroxy-3-methylthio-5-phenyl-phenyl-1,2,3a,4,7-penta-azaindene*

3,4-diamino-5-methylthio-1,2,4-triazole (1.45 g.) and ethyl phenylglyoxylate (1.75 ml.) were reacted together in refluxing glacial acetic acid (2 ml.) for 2 hours. Ether was then added to the reaction mixture and after decanting off the ethereal layer the remaining solid was three times recrystallised from ethanol to yield off-white fluffy needles (0.25 g.), M. Pt. 249-254° C.

The same product was obtained when 6-hydroxy-3-mercapto-5-phenyl-1,2,3a,4,7-penta-azaindene (2.5 g.) dissolved in a solution of sodium hydroxide (0.4 g.) in water (54 ml.) was shaken for one hour with methyl iodide (1.5 ml.). The resulting solid was filtered off and upon recrystallisation once from ethanol yielded off-white fluffy needles (0.5 g.).

The infra-red absorption spectra of both products showed them to be identical in structure.

EXAMPLE 16

*Preparation of 3,5-dimethyl-6-hydroxy-1,2,3a,4,7-penta-azaindene*

3-acethydrazino-5-hydroxy-6-methyl-1,2,4-triazine (1.1 g.) was boiled under reflux with glacial acetic acid (30 ml.) for 2½ hours. The initially insoluble starting material gradually dissolved until only a trace of insoluble material remained. The reaction mixture was then cooled and filtered. The clear filtrate was evaporated to dryness under reduced pressure and the residue remaining was recrystallised from ethanol (30 ml.) to yield the product as colourless needles (0.6 g.), M. Pt. 245-246° C.

The same product was obtained when 3-acethydrazino-5-hydroxy-6-methyl-1,2,4-triazine (1.0 g.) was heated under reduced pressure in a silicone fluid bath at 250-265° C. for 5 mins. Recrystallisation from ethanol (20 ml.) yielded the product as off-white needles (0.2 g.) M. Pt. 247-248° C.

The same product was obtained when 3-hydrazino-5-hydroxy-6-methyl-1,2,4-triazine (1.0 g.) was heated under reflux with an excess of glacial acetic acid (30 ml.) for 2½ hours. The initially formed and precipitated 3-acethydrazino-5-hydroxy-6-methyl-1,2,4-triazine gradually dissolved during the course of the reaction. At the end of the reaction time the acetic acid was removed by distillation under reduced pressure. The residue remaining was recrystallised from ethanol (30 ml.) to yield colourless needles (0.6 g.), M. Pt. 245-246° C.

The infra-red absorption spectra and ultra-violet absorption spectra of the above products showed them to be identical in structure to the product described in Example 4.

*Preparation of the intermediate 3-acethydrazino-5-hydroxy-6-methyl-1,2,4-triazine*

3-methylthio-5-hydroxy-6-methyl-1,2,4-triazine (7.8 g.) and acethydrazide (4.0 g.) were reacted together in refluxing 2-methoxyethanol (25 ml.) for ½ hour. The product crystallized out of solution during the course of the reaction. The hot reaction mixture was then poured into hot ethanol (50 ml.) and filtered hot to yield colourless crystals (3.0 g.) M. Pt. 241° C.

3-hydrazino-5-hydroxy-6-methyl-1,2,4-triazine (10 g.) was boiled under reflux with glacial acetic acid (40 ml.) for 6 minutes. The product crystallised out of solution during the course of the reaction. The hot reaction mixture was then poured into ethanol (250 ml.) and the solids filtered off, boiled with ethanol (250 ml.), cooled and filtered to yield colourless crystals (5.5 g.) M. Pt. 235-237° C.

The infra-red absorption spectra of both products showed them to be identical.

We claim as our invention:

1. A photographic silver halide emulsion containing, as a stabilising agent, a penta-azaindene compound of the formula:

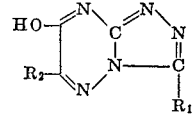

wherein $R_1$ is selected from the class consisting of hydrogen, alkyl, aryl, aralkyl, mercapto, alkylthio and aralkylthio and $R_2$ is selected from the class consisting of hydrogen, alkyl, aryl, aralkyl and alkoxy carbonyl.

2. A photographic silver halide emulsion containing, as a stabilising agent, a penta-azaindene compound of the formula:

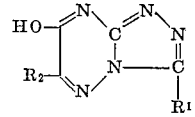

wherein $R_1$ is selected from the class consisting of hydrogen, alkyl, aryl, aralkyl, mercapto, alkylthio and aralkylthio and $R_2$ is selected from the class consisting of hydrogen, alkyl, aryl, aralkyl and alkoxy carbonyl, $R_1$ being other than hydrogen when $R_2$ is methyl.

3. A photographic silver halide emulsion containing, as a stabilising agent, 0.02 to 1.0 g. per g. mol of silver halide present in the emulsion of a penta-azaindene compound of the formula:

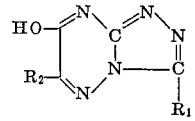

wherein $R_1$ is selected from the class consisting of hydrogen, alkyl, aryl, aralkyl, mercapto, alkylthio and aralkylthio and $R_2$ is selected from the class consisting of hydrogen, alkyl, aryl, aralkyl and alkoxy carbonyl.

4. A photographic silver halide emulsion as set forth in claim 3 in which said penta-azaindene compound is 5-methyl-6-hydroxy-1,2,3a,4,7-penta-azaindene.

5. A photographic silver halide emulsion as set forth in claim 3 in which said penta-azaindene compound is 6-hydroxy-3-mercapto-5-methyl-1,2,3a,4,7-penta-azaindene.

6. A photographic silver halide emulsion as set forth in claim 3 in which said penta-azaindene compound is 6-hydroxy-3-methylthio-5-methyl-1,2,3a,4,7-penta-azaindene.

7. A photographic silver halide emulsion as set forth in claim 3 in which said penta-azaindene compound is 3,5-dimethyl-6-hydroxyl-1,2,3a,4,7-penta-azaindene.

8. A photographic silver halide emulsion as set forth in claim 3 in which said penta-azaindene compound is 3-ethyl-6-hydroxy-5-methyl-1,2,3a,4,7-penta-azaindene.

9. A photographic silver halide emulsion as set forth in claim 3 in which said penta-azaindene compound is 3-benzylthio-6-hydroxy-5-methyl-1,2,3a,4,7-penta-azaindene.

10. A photographic silver halide emulsion as set forth in claim 3 in which said penta-azaindene compound is 6-hydroxy-1,2,3a,4,7-penta-azaindene.

11. A photographic silver halide emulsion as set forth in claim 3 in which said penta-azaindene compound is 6-hydroxy-3-methylthio-1,2,3a,4,7-penta-azaindene.

12. A photographic silver halide emulsion as set forth in claim 3 in which said penta-azaindene compound is 3-benzylthio-6-hydroxy-1,2,3a,4,7-penta-azaindene.

13. A photographic silver halide emulsion as set forth in claim 3 in which said penta-azaindene compound is 6-hydroxy-3-methyl-1,2,3a,4,7-penta-azaindene.

14. A photographic silver halide emulsion as set forth in claim 3 in which said penta-azaindene compound is 3-ethyl-6-hydroxy-5-phenyl-1,2,3a,4,7-penta-azaindene.

15. A photographic silver halide emulsion as set forth in claim 3 in which said penta-azaindene compound is 6-hydroxy-3-methyl-5-phenyl-1,2,3a,4,7-penta-azaindene.

16. A photographic silver halide emulsion as set forth in claim 3 in which said penta-azaindene compound is 6-hydroxy-5-phenyl-1,2,3a,4,7-penta-azaindene.

17. A photographic silver halide emulsion as set forth in claim 3 in which said penta-azaindene compound is 6-hydroxy-3-mercapto-5-phenyl-1,2,3a,4,7-penta-azaindene.

18. A photographic silver halide emulsion as set forth in claim 3 in which said penta-azaindene compound is 6-hydroxy-3-methylthio-5-phenyl-1,2,3a,4,7 - penta-azaindene.

19. A photographic silver halide emulsion as set forth in claim 3 in which said penta-azaindene compound is 3,5-dimethyl-6-hydroxy-1,2,3a,4,7-penta-azaindene.

No references cited.

NORMAN G. TORCHIN, *Primary Examiner.*

J. RAUBICHEK, *Assistant Examiner.*